(12) United States Patent
Qiu

(10) Patent No.: US 10,664,305 B1
(45) Date of Patent: *May 26, 2020

(54) METHOD AND APPARATUS FOR WRITING SERVICE DATA INTO BLOCK CHAIN AND METHOD FOR DETERMINING SERVICE SUBSET

(71) Applicant: ALIBABA GROUP HOLDING LIMITED, Grand Cayman (KY)

(72) Inventor: Honglin Qiu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,519

(22) Filed: Jan. 17, 2020

Related U.S. Application Data

(63) Continuation of application No. 16/535,035, filed on Aug. 7, 2019, which is a continuation of application No. PCT/CN2018/077286, filed on Feb. 26, 2018.

(30) Foreign Application Priority Data

Feb. 28, 2017 (CN) .......................... 2017 1 0116539

(51) Int. Cl.
*G06F 9/46* (2006.01)
*G06F 9/28* (2006.01)
(Continued)

(52) U.S. Cl.
CPC ............... *G06F 9/466* (2013.01); *G06F 9/28* (2013.01); *G06F 9/4837* (2013.01); *H04L 9/0637* (2013.01)

(58) Field of Classification Search
None
See application file for complete search history.

(56) References Cited

U.S. PATENT DOCUMENTS 9,553,982 B2   1/2017  Unitt
9,594,644 B2   3/2017  Abouzour et al.
(Continued)

FOREIGN PATENT DOCUMENTS

CN   105893042 A   8/2016
CN   106330431 A   1/2017
(Continued)

OTHER PUBLICATIONS

Search Report dated Feb. 19, 2019, issued in related Taiwan Application No. 106139289 (1 page).
(Continued)

*Primary Examiner* — Bing Zhao
(74) *Attorney, Agent, or Firm* — Sheppard Mullin Richter & Hampton LLP

(57) ABSTRACT

Methods, systems, and apparatus, including computer programs encoded on computer storage media, for adding transaction data into a blockchain are provided. One of the methods includes: obtaining transaction data to be added into the blockchain, assigning the transaction data into transaction subsets, and executing the transaction subsets in parallel, and storing results of the execution into the blockchain. Pieces of the transaction data having at least one of: a same transaction type or an overlapping scope of data change are assigned into a same transaction subset, and pieces of the transaction data with different transaction types and with no overlapping scope of data change are assigned into different transaction subsets.

20 Claims, 5 Drawing Sheets

(51) Int. Cl.
*G06F 9/48* (2006.01)
*H04L 9/06* (2006.01)

(56) References Cited

U.S. PATENT DOCUMENTS

| | | | |
|---|---|---|---|
| 9,794,074 | B2 | 10/2017 | Toll et al. |
| 10,255,108 | B2 | 4/2019 | Dillenberger et al. |
| 2010/0287554 | A1 | 11/2010 | Amundsen et al. |
| 2013/0339329 | A1 | 12/2013 | Greiner et al. |
| 2015/0199482 | A1 | 7/2015 | Corbin et al. |
| 2015/0379510 | A1 | 12/2015 | Smith |
| 2016/0085639 | A1 | 3/2016 | Abouzour et al. |
| 2016/0261685 | A1 | 9/2016 | Chen et al. |
| 2016/0261690 | A1 | 9/2016 | Ford |
| 2016/0330034 | A1 | 11/2016 | Back et al. |
| 2017/0212781 | A1 | 7/2017 | Dillenberger et al. |
| 2017/0230353 | A1 | 8/2017 | Kurian et al. |
| 2017/0244707 | A1 | 8/2017 | Johnsrud et al. |
| 2017/0264428 | A1 | 9/2017 | Seger, II |
| 2017/0287090 | A1 | 10/2017 | Hunn et al. |
| 2017/0289111 | A1 | 10/2017 | Voell et al. |
| 2018/0308134 | A1 | 10/2018 | Manning et al. |
| 2018/0341648 | A1 | 11/2018 | Kakavand et al. |
| 2019/0026485 | A1 | 1/2019 | Ansari et al. |
| 2019/0139047 | A1 | 5/2019 | Ronnow et al. |
| 2019/0158470 | A1 | 5/2019 | Wright et al. |

FOREIGN PATENT DOCUMENTS

| | | |
|---|---|---|
| CN | 106406896 A | 2/2017 |
| CN | 106682984 A | 5/2017 |
| CN | 106980649 A | 7/2017 |
| CN | 108427601 A | 8/2018 |
| KR | 101634481 B1 | 7/2016 |
| TW | 201315211 A | 4/2013 |
| TW | 201602830 A | 1/2016 |
| TW | 201611581 A | 3/2016 |
| WO | 2017112664 A1 | 6/2017 |
| WO | 2017132641 A1 | 8/2017 |
| WO | 2017136643 A1 | 8/2017 |
| WO | 2017155742 A1 | 9/2017 |
| WO | 2017173271 A1 | 10/2017 |
| WO | 2017173399 A1 | 10/2017 |
| WO | 2017187397 A1 | 11/2017 |
| WO | 2017194815 A1 | 11/2017 |
| WO | 2018007916 A1 | 1/2018 |
| WO | 2018013124 A1 | 1/2018 |
| WO | 2018041066 A1 | 3/2018 |

OTHER PUBLICATIONS

PCT Search Report and the Written Opinion dated May 31, 2018, issued in related International Application No. PCT/CN2018/077286 (9 pages).

Office Action for Canadian Application No. 3054813, dated Oct. 7, 2019, 5 pages.

First Search for Chinese Application No. 20710116539.7, dated Oct. 23, 2019, 2 pages.

First Office Action for Chinese Application No. 20710116539.7, dated Nov. 1, 2019, 13 pages (English machine translation).

International Preliminary Report on Patentability for PCT Application No. PCT/CN2018/077286, dated Sep. 12, 2019, 12 pages.

Office Action for Korea Application No. 10-2019-7023701, dated Dec. 9, 2019, 10 pages.

Search Report for European Application No. 18760329.5 dated Dec. 13, 2019, 4 pages.

Dickerson et al., "Adding Concurrency to Smart Contracts", Feb. 15, 2017, 18 pages.

Lerner, "Interdependent Transactions in Bitcoin, RSK and Ethereum—CoinFabrik Blog", Jun. 14, 2016, retrieved from https://blog.coinfabrik.com/interdependent-transactions-in-bitcoin-rsk-and-ethereum/, retrieved on Dec. 5, 2019, 8 pages.

Wolfe et al., "Data dependence and its application to parallel processing", International Journal of Parallel Programming, Apr. 1987, vol. 16, No. 2, p. 137-178.

Examination Report No. 1 for Australian Patent Application No. 2018228540 dated Dec. 19, 2019, 5 pages.

Examination Report for European Application No. 18760329.5 dated Jan. 31, 2020, 6 pages.

Office Action for Japanese Application No. 2019-546907 dated Feb. 25, 2020 (5 pages).

Notice of Allowance for Korean Application No. 10-2019-7023701 dated Mar. 6, 2020 (3 pages).

METHOD AND APPARATUS FOR WRITING SERVICE DATA INTO BLOCK CHAIN AND METHOD FOR DETERMINING SERVICE SUBSET

CROSS REFERENCE TO RELATED APPLICATIONS

The present application is a continuation application of U.S. application Ser. No. 16/535,035, filed on Aug. 7, 2019, and titled "Method and Apparatus for Writing Service Data into Block Chain and Method for Determining Service Subset," which is a continuation application of International Patent Application No. PCT/CN2018/077286, filed on Feb. 26, 2018, and titled "Method and Apparatus for Writing Service Data into Blockchain and Method for Determining Service Subset," which claims priority to Chinese Patent Application No. 201710116539.7, filed on Feb. 28, 2017. The entire contents of all of the above applications are incorporated herein by reference in their entirety.

TECHNICAL FIELD

The present application relates to the field of computer technologies, and in particular, to a method and apparatus for writing transaction data into a blockchain and a method for determining a transaction subset of blockchain transaction data.

BACKGROUND

With the development of computer technologies, blockchain technologies (also referred to as distributed ledger network) have been extensively used in numerous fields, such as smart contracts, securities transactions, e-commerce, Internet of Things, social communications, document storage, existence proof, identity verification, and equity crowdfunding due to advantages such as decentralization, openness and transparency, immutability, and trustworthiness.

In one example, the blockchain technologies are a type of decentralized and distributed database technologies. Each piece of data in a blockchain will be broadcast to all blockchain nodes of the entire network, and each node keeps the full amount of data that is consistent with each other. The blockchain technologies require that all nodes keep the same state, including the database state and the like. To ensure the consistency in the database state, it is required that blockchain transactions are in an ordered sequence that is consistent for all nodes, and all nodes execute transactions in such sequence to complete transaction verification, implementation, inclusion of data in the chain, etc. Take the blockchain application of Ethereum as an example, a timestamp is created when each transaction is received, the transactions are written into a transaction pool, and the transactions are sorted according to the timestamps; during mining, the transactions are executed according to the sequence of transaction timestamps, and the account information after the execution of each transaction is updated into a database, thereby achieving the update of the database account state.

In the current technologies, to ensure consistency in the database state, data is to be processed according to a string of timestamps of transaction (e.g., transaction data to be written into a blockchain) reception. Therefore, only one single machine may perform the execution, causing the write performance and efficiency of a database to be limited by the performance of a single machine. To improve the write performance and efficiency, physical properties, such as CPU, of a single machine have to be improved, such as increasing the core number of CPU, which not only leads to high cost, but also limits expandability.

SUMMARY

Embodiments of the present specification provide a method and apparatus for writing transaction data into a blockchain, which may reduce the cost required for improving the execution efficiency of data processing and improve expandability.

The embodiments of the present specification further provide a method for determining a transaction subset of blockchain transaction data, which may reasonably allocate transaction data, thereby reducing the cost required for improving the execution efficiency of data processing and improving expandability.

In some embodiments, a method for adding transaction data into a blockchain comprises: obtaining transaction data to be added into the blockchain, assigning the transaction data into transaction subsets, and executing the transaction subsets in parallel, and storing results of the execution into the blockchain. Pieces of the transaction data having at least one of: a same transaction type or an overlapping scope of data change are assigned into a same transaction subset, and pieces of the transaction data with different transaction types and with no overlapping scope of data change are assigned into different transaction subsets.

In some embodiments, the executing the transaction subsets in parallel comprises: executing the transaction data in the different transaction subsets in parallel using multi-threading or a machine cluster.

In some embodiments, each piece of transaction data corresponds to a timestamp; and the executing the transaction data in parallel comprises: executing the pieces of transaction data comprised in the same transaction subset in series according to a temporal order corresponding to the timestamps.

In some embodiments, the assigning the transaction data into transaction subsets comprises: determining one or more level I transaction subsets for the transaction data according to the transaction data's transaction type.

In one embodiment, the determining one or more level I transaction subsets for the transaction data according to the transaction data's transaction type comprises: assigning pieces of the transaction data with the same transaction type in a same level I transaction subset; and assigning pieces of the transaction data with different transaction types into different level I transaction subsets.

In one embodiment, the assigning the transaction data into transaction subsets further comprises: determining one or more level II transaction subsets for each of the one or more level I transaction subsets according to the transaction data's scope of data change, each of the one or more level II transaction subsets being a subset under one of the one or more level I transaction subsets. Executing the transaction subsets in parallel comprises: executing a plurality of level II transaction subsets corresponding to the one or more level I transaction subsets in parallel.

In one embodiment, the determining one or more level II transaction subsets for each of the one or more level I transaction subsets according to the transaction data's scope of data change comprises: assigning pieces of transaction data in each of the one or more level I subsets with the overlapping scope of data change in a same level II transaction subset; and assigning pieces of the transaction data in the each level I subset with no overlapping scope of data change into different level II transaction subsets.

In one embodiment, the determining one or more level II transaction subsets for each of the one or more level I transaction subsets according to the transaction data's scope of data change comprises: traversing a scope of data change of each piece of transaction data in a first level I transaction subset; in response to that a scope of data change of a second piece of transaction data overlaps with a scope of data change of a first level II transaction subset, adding the second piece of transaction data into the first level II transaction subset; and in response to that the scope of data change of the second piece of transaction data does not overlap with the scope of data change of the first level II transaction subset, creating a second level II transaction subset and adding the second piece of transaction data into the second level II transaction sub set.

In some embodiments, the assigning the transaction data into transaction subsets comprises: determining one or more level I transaction subsets for the transaction data according to the transaction data's scope of data change.

In one embodiment, the determining one or more level I transaction subsets for the transaction data according to the transaction data's scope of data change comprises: assigning pieces of the transaction data with the overlapping scope of data change in a same level I transaction subset; and assigning pieces of the transaction data with no overlapping scope of data change into different level I transaction subsets.

In one embodiment, the assigning the transaction data into transaction subsets further comprises: determining one or more level II transaction subsets for each of the one or more level I transaction subsets according to the transaction data's transaction type, each of the one or more level II transaction subsets being a subset under one of the one or more level I transaction subsets. Executing the transaction subsets in parallel comprises: executing a plurality of level II transaction subsets corresponding to the one or more level I transaction subsets in parallel.

In one embodiment, the determining one or more level II transaction subsets for each of the one or more level I transaction subsets according to the transaction data's transaction type comprises: assigning pieces of transaction data in each of the one or more level I subsets with the same transaction type in a same level II transaction subset; and assigning pieces of the transaction data in the each level I subset with different transaction types into different level II transaction subsets.

In one embodiment, the determining one or more level II transaction subsets for each of the one or more level I transaction subsets according to the transaction data's transaction type comprises: traversing a transaction type of each piece of transaction data in a first level I transaction subset; in response to that a transaction type of a second piece of transaction data is the same as a transaction type of one or more pieces of transaction data of a first level II transaction subset, adding the second piece of transaction data into the first level II transaction subset; and in response to that the transaction type of the second piece of transaction data is different from the transaction type of all pieces of transaction data of the first level II transaction subset, creating a second level II transaction subset and adding the second piece of transaction data into the second level II transaction subset.

In some embodiments, a system for adding transaction data into a blockchain, comprising one or more processors and one or more non-transitory computer-readable memories coupled to the one or more processors and configured with instructions executable by the one or more processors to cause the system to perform operations comprising: obtaining transaction data to be added into the blockchain, assigning the transaction data into transaction subsets, and executing the transaction subsets in parallel, and storing results of the execution into the blockchain. Pieces of the transaction data having at least one of: a same transaction type or an overlapping scope of data change are assigned into a same transaction subset, and pieces of the transaction data with different transaction types and with no overlapping scope of data change are assigned into different transaction subsets.

In some embodiments, a non-transitory computer-readable storage medium configured with instructions executable by one or more processors to cause the one or more processors to perform operations comprising: obtaining transaction data to be added into the blockchain, assigning the transaction data into transaction subsets, and executing the transaction subsets in parallel, and storing results of the execution into the blockchain. Pieces of the transaction data having at least one of: a same transaction type or an overlapping scope of data change are assigned into a same transaction subset, and pieces of the transaction data with different transaction types and with no overlapping scope of data change are assigned into different transaction subsets.

In some embodiments, the method for writing transaction data into a blockchain provided by the embodiments of the present specification comprises: obtaining a plurality of pieces of transaction data to be written into the blockchain; assigning the transaction data into transaction subsets based on at least one of: a transaction type or a scope of data change of the transaction data, wherein: assigning the transaction data into the transaction subsets comprises: assigning multiple pieces of transaction data with a transaction dependency in a same transaction subset and assigning multiple pieces of transaction data without the transaction dependency into different transaction subsets; and executing the transaction subsets in parallel, and writing results of the execution into the blockchain.

In some embodiments, assigning the transaction data into transaction subsets based on at least one of: a transaction type or a scope of data change of the transaction data comprises: determining a transaction subset to which a piece of transaction data belongs according to a data attribute of the piece of transaction data, wherein the data attribute has a corresponding relationship with at least one of: a transaction type or a scope of data change of the piece of transaction data, and the data attribute indicates whether the transaction dependency exists between the piece of transaction data and other pieces of transaction data.

In some embodiments, the executing the transaction subsets in parallel comprises: executing the transaction data in the different transaction subsets in parallel using multi-threading or a machine cluster.

In some embodiments, each piece of transaction data corresponds to a timestamp, and executing the transaction data in the transaction subsets in parallel comprises: executing pieces of transaction data comprised in a same transaction subset in series according to a temporal order corresponding to the timestamps.

In some embodiments, assigning the transaction data into transaction subsets based on at least one of: a transaction type or a scope of data change of the transaction data comprises: according to the transaction types of pieces of transaction data, putting pieces of transaction data of a same transaction type into a same transaction subset, and dividing pieces of transaction data of different transaction types into the different transaction subsets.

In some embodiments, assigning the transaction data into transaction subsets based on at least one of: a transaction type or a scope of data change of the transaction data comprises: according to a scope of data change in each piece of transaction data, putting pieces of transaction data having overlapping scopes of data change into a same transaction subset, and dividing pieces of transaction data having scopes of data change that do not overlap into the different transaction subsets. The scope of data change in each piece of transaction data may include a set of objects involved in the data change in the each piece of transaction data.

In some embodiments, according to a scope of data change in each piece of transaction data, putting pieces of transaction data having overlapping scopes of data change into a same transaction subset, and dividing pieces of transaction data having scopes of data change that do not overlap into the different transaction subsets comprises: traversing the scope of date change of each piece of transaction data; in response to that the scope of data change of a first piece of transaction data overlaps with a scope of data change of a first transaction subset, adding the first piece of transaction data into the first transaction subset; and in response to that the scope of data change of the first piece of transaction data does not overlap with the scope of data change of the first transaction subset, creating a second transaction subset and adding the first piece of transaction data into the second transaction subset. The first pieces of transaction data may be any of the pieces of transaction data, the first transaction subset may be any of the transaction subsets, and the second transaction subset may be different from the first transaction subset.

In some embodiments, the scope of data change of the first transaction subset is a union of scopes of data change of pieces of transaction data comprised in the transaction subset.

In some embodiments, each piece of transaction data corresponds to a timestamp, and traversing the scope of data change of each piece of transaction data comprises: traversing in a temporal order corresponding to the timestamps of the transaction data.

In some embodiments, assigning the transaction data into transaction subsets based on at least one of: a transaction type or a scope of data change of the transaction data comprises: determining a level I subset to which pieces of transaction data belong according to transaction types of the pieces of transaction data; and determining level II subsets to which the pieces of transaction data in the level I subset belong according to a scope of data change of each piece of transaction data, and using the level II subsets as the transaction subsets, wherein a level II subset is a subset of the level I subset.

In some embodiments, determining a level I subset to which pieces of transaction data belong comprises: according to transaction types of the pieces of transaction data, putting pieces of transaction data of a same transaction type into a same level I subset, and dividing pieces of transaction data of different transaction types into different level I subsets.

In some embodiments, determining level II subsets to which the pieces of transaction data in the level I subset belong comprises: according to the scope of data change of each piece of transaction data in the level I subset, putting pieces of transaction data having overlapping scopes of data change into a same level II subset, and dividing pieces of transaction data having scopes of data change that do not overlap into different level II subsets.

In some embodiments, according to the scope of data change of each piece of transaction data in the level I subset, putting pieces of transaction data having overlapping scopes of data change into a same level II subset, and dividing pieces of transaction data having scopes of data change that do not overlap into different level II subsets comprises: traversing the scope of data change of each piece of transaction data in a first level I subset; in response to that the scope of data change of a second piece of transaction data overlaps with a scope of data change of a first level II subset, adding the second piece of transaction data into the first level II subset; and in response to that the scope of data change of the second piece of transaction data does not overlap with the scope of data change of the first level II subset, creating a second level II subset and adding the second piece of transaction data into the second level II subset; wherein the first level I subset is any of the level I subsets, the second piece of transaction data is any of the pieces of the transaction data in the first level I subset, the first level II subset is any of the level II subsets in the first level I subset, and the second level II subset is different from the first level II subset.

In some embodiments, the plurality of pieces of transaction data to be executed are obtained based on at least one of: a preset amount or a preset period of time.

In some embodiments, another method for writing transaction data into a blockchain comprises: obtaining a plurality of pieces of transaction data to be written into a blockchain; determining first transaction data without a transaction dependency relationship according to a scope of data change of the transaction data, wherein there is no transaction dependency relationship among the first transaction data; and executing the first transaction data in parallel, and writing an execution result into the blockchain.

In some embodiments, the determining first transaction data without a transaction dependency relationship according to the scope of data change of the transaction data comprises: according to scope of data change of the transaction data, determining transaction data with a scope of data change not overlapping a scope of data change of any other piece of transaction data as the first transaction data having no transaction dependency relationship.

In some embodiments, an apparatus for writing transaction data into a blockchain comprises: an obtaining module configured to obtain a plurality of pieces of transaction data to be written into a blockchain; a transaction subset determining module configured to determine a transaction subset to which the transaction data belongs according to at least one of: a transaction type or a scope of data change of the transaction data, wherein there is no transaction dependency relationship among transaction data belonging to different transaction subsets; and a data executing module configured to execute the transaction subsets in parallel, and write an execution result into the blockchain.

In some embodiments, a method for determining a transaction subset of blockchain transaction data comprises: after a plurality of pieces of transaction data to be written into a blockchain are obtained, determining transaction subsets to which the transaction data belongs according to at least one of: a transaction type or a scope of data change of the transaction data, for executing the transaction subsets in parallel and writing an execution result into the blockchain, wherein there is no transaction dependency relationship among transaction data belonging to different transaction subsets.

In some embodiments, the determining transaction subsets to which the transaction data belongs according to at least one of: a transaction type or a scope of data change of the transaction data comprises: determining the transaction subsets to which the transaction data belongs according to data attributes of the transaction data, wherein a data attribute has a corresponding relationship with at least one of: a transaction type or a scope of data change of the transaction data, and the data attribute represents a transaction dependency relationship of the transaction data.

In some embodiments, the determining transaction subsets to which the transaction data belongs according to transaction types of the transaction data comprises: according to the transaction types of the transaction data, putting transaction data of a same transaction type into the same transaction subset, and dividing transaction data of different transaction types into the different transaction subsets; or the determining transaction subsets to which the transaction data belongs according to scopes of data change of the transaction data comprises: according to the scopes of data change of the transaction data, putting transaction data having overlapping scopes of data change into the same transaction subset, and dividing transaction data having scopes of data change that do not overlap into the different transaction subsets.

In some embodiments, the determining transaction subsets to which the transaction data belongs according to transaction types and scopes of data change of the transaction data comprises: determining a level I subset to which the transaction data belongs according to the transaction types of the transaction data; and determining a level II subset to which the transaction data belongs according to the scopes of data change of the transaction data in the level I subset, and using the level II subset as one of the transaction subsets, wherein the level II subset is a subset of the level I subset.

In some embodiments, a system for writing transaction data into a blockchain comprises one or more processors and one or more non-transitory computer-readable memories coupled to the one or more processors and configured with instructions executable by the one or more processors to cause the system to perform operations comprising: obtaining a plurality of pieces of transaction data to be written into the blockchain; assigning the transaction data into transaction subsets based on at least one of: a transaction type or a scope of data change of the transaction data, wherein: assigning the transaction data into the transaction subsets comprises: assigning multiple pieces of transaction data with a transaction dependency in a same transaction subset and assigning multiple pieces of transaction data without the transaction dependency into different transaction subsets; and executing the transaction subsets in parallel, and writing results of the execution into the blockchain.

In some embodiments, a non-transitory computer-readable storage medium is configured with instructions executable by one or more processors to cause the one or more processors to perform operations comprising: obtaining a plurality of pieces of transaction data to be written into the blockchain; assigning the transaction data into transaction subsets based on at least one of: a transaction type or a scope of data change of the transaction data, wherein: assigning the transaction data into the transaction subsets comprises: assigning multiple pieces of transaction data with a transaction dependency in a same transaction subset and assigning multiple pieces of transaction data without the transaction dependency into different transaction subsets; and executing the transaction subsets in parallel, and writing results of the execution into the blockchain.

The above-described at least one technical solution employed by the embodiments of the present specification can achieve the following advantageous effects. In the embodiments of the present specification, after transaction data to be written into a blockchain is obtained, whether there is a transaction dependency relationship among the transaction data may be determined according to transaction types or scopes of data change of the transaction data, and then the transaction data may be divided into different transaction subsets according to the situation of transaction dependency among the transaction data. Since there is no transaction dependency relationship among transaction data belonging to different transaction subsets, different transaction subsets may be executed in parallel without affecting the consistency in the database state. According to the solutions provided by the embodiments of the present specification, executing transaction data without a transaction dependency relationship in parallel not only ensures the consistency in the database state, but also improves the execution efficiency of data processing without relying on improvements of the performance of individual machines. Therefore, the performance requirements for individual machines may be lowered, which favors cost saving and leads to a better expandability.

BRIEF DESCRIPTION OF THE DRAWINGS

The accompanying drawings to be described here are used to provide a better understanding of the present specification and constitute a part of the present specification. The exemplary embodiments of the present specification and the description of the exemplary embodiments are used to describe the present specification and do not constitute improper limitations to the present specification. In the accompanying drawings.

DETAILED DESCRIPTION

The technical solutions of the present specification will be clearly and completely described below with reference to the embodiments and the accompanying drawings of the present specification. The described embodiments are merely some, but not all, embodiments of the present specification. On the basis of the embodiments of the present specification, all other embodiments obtainable by one of ordinary skill in the art without creative effort shall fall within the scope of the present specification.

The technical solutions provided in the embodiments of the present specification will be described in detail below with reference to the accompanying drawings.

Figure 1:
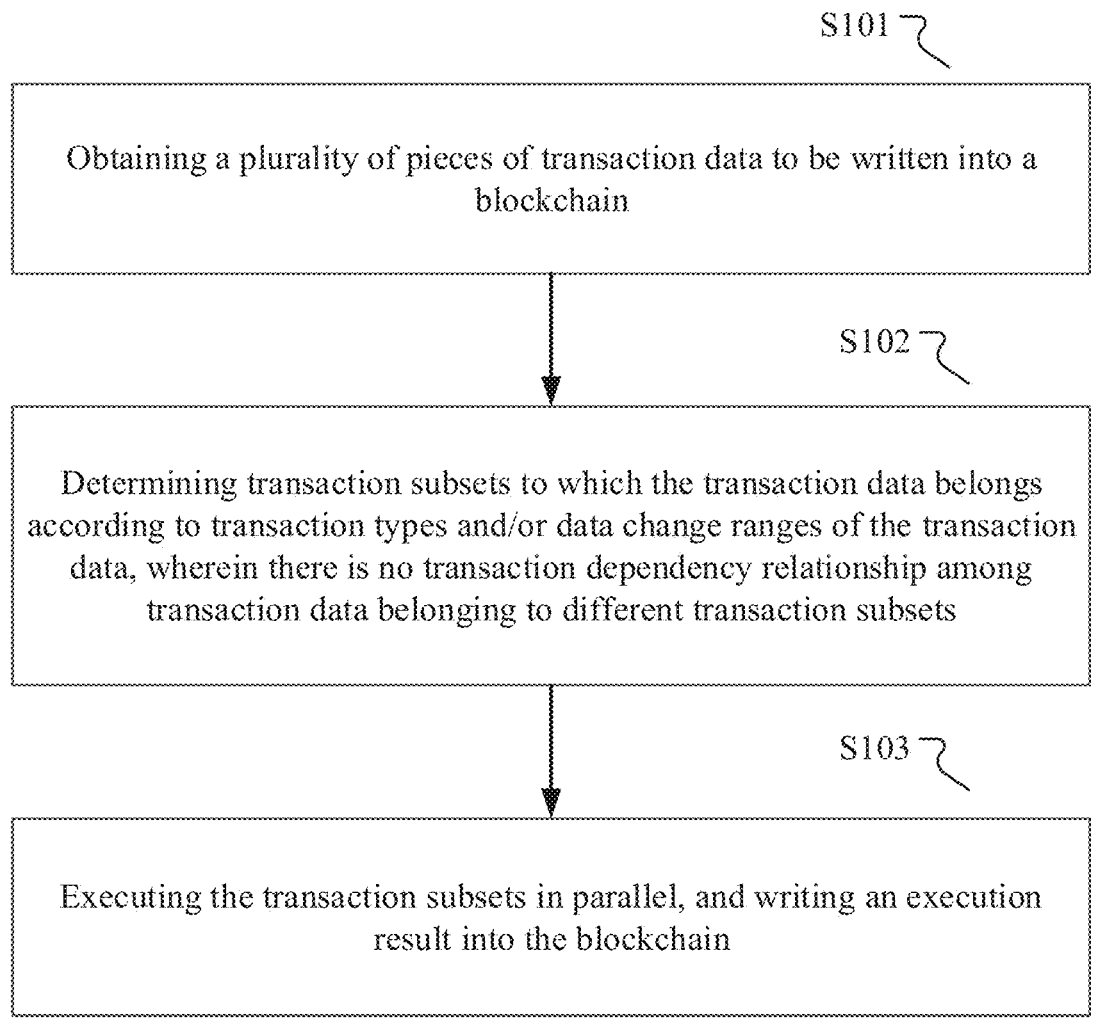
FIG. 1 is a flow chart of a method for writing transaction data into a blockchain according to some embodiments of the present specification.

FIG. 1 illustrates a method for writing transaction data into a blockchain according to some embodiments of the present specification, comprising S101 to S103.

S101: obtaining a plurality of pieces of transaction data to be written into a blockchain;

S102: determining transaction subsets to which the transaction data belongs according to transaction types and/or scopes of data change of the transaction data, wherein there is no transaction dependency relationship among transaction data belonging to different transaction subsets; and S103: executing the transaction subsets in parallel, and writing an execution result into the blockchain.

In some embodiments, S101 includes obtaining transaction data to be added into the blockchain; S102 includes assigning the transaction data into transaction subsets, wherein pieces of the transaction data having at least one of: a same transaction type or an overlapping scope of data change are assigned into a same transaction subset, and pieces of the transaction data with different transaction types and with no overlapping scope of data change are assigned into different transaction subsets; and S103 includes executing the transaction subsets in parallel, and storing results of the execution into the blockchain.

In the above-described embodiment, after the step S101 is executed to obtain transaction data to be written into a blockchain, whether there is a transaction dependency relationship among the transaction data may be determined according to transaction types or scopes of data change of the transaction data, and then the transaction data may be divided into different transaction subsets according to the situation of transaction dependency among the transaction data. Since there is no transaction dependency relationship among transaction data belonging to different transaction subsets, different transaction subsets may be executed in parallel without affecting the consistency in the database state. According to the solutions provided by the embodiments of the present specification, the manner in which transaction data in a transaction subset is executed in parallel may improve the execution efficiency of data processing without relying on improvements of the performance of individual machines. Therefore, the performance requirements for individual machines may be lowered, which favors cost saving and leads to a better expandability.

In some embodiments, after a plurality of pieces of transaction data are obtained after the step S101 is executed, a transaction set to be executed comprising the transaction data to be executed may be formed, and the transaction set may be determined by a preset data processing amount and/or a preset transaction data time. In one example, transaction data to be executed in the same batch may be determined by presetting a data processing amount, and an exemplary value of the preset data processing amount may be determined according to an amount of data allowed to be written into a blockchain. For example, an amount of transaction data allowed to be written into a blockchain is 1,000, and then the preset data processing amount may be set to be less than 1,000, e.g., 800, so as to meet the requirement. In an exemplary implementation, every time when a server receives 800 pieces of transaction data, the server may form a transaction set to be executed for subsequent processing. When the transaction set to be executed is determined, transaction data to be executed in the same batch may also be determined by presetting a transaction data time. For example, the preset transaction data time is set to be 1 s, and then the transaction data to be executed in the same batch is transaction data generated in parallel within 1 s.

When the step S103 is executed, since the transaction data has been divided into a plurality of transaction subsets without a transaction dependency relationship, the transaction subsets may be executed in parallel using multithreading or a machine cluster, which not only meets the requirement for consistency in the database state, but also achieves the goal of improving the data execution efficiency. In this manner, the data execution efficiency may be improved without relying on improvements of the performance of individual machines. Therefore, the performance requirements for individual machines may be lowered, which favors cost saving and leads to a better expandability by using the manner of machine cluster.

In another example, when transaction subsets comprising the transaction data are executed, there is no transaction dependency relationship among the transaction data divided into different transaction subsets, while there is a transaction dependency relationship among the transaction data put into the same transaction subset. Therefore, different transaction subsets may be executed in parallel to improve the data execution efficiency, while transaction data in the same transaction subset may be executed in series to ensure the consistency in the database state. In one example, there is a corresponding relationship between the transaction data and timestamps, and then when a transaction subset is executed, transaction data comprised in the transaction subset is executed in series according to a temporal order corresponding to the timestamps. Furthermore, the execution of each piece of transaction data is performed in an order of transaction verification, transaction implementation, and inclusion of data in the chain to finally write an execution result into the blockchain.

When the step S102 is executed, the transaction subsets may be determined in a variety of different manners, as long as transaction data with a transaction dependency relationship is separated from transaction data without a transaction dependency relationship. In one example, a transaction subset to which the transaction data belongs may be determined according to a data attribute of the transaction data, wherein the data attribute has a corresponding relationship with a transaction type and/or a scope of data change of the transaction data, and the data attribute indicates whether there is a transaction dependency relationship of the transaction data. Then, transaction data with a transaction dependency relationship may be put into the same transaction subset, and transaction data without a transaction dependency relationship may be divided into different transaction subsets according to the data attribute extracted from the transaction data, thereby achieving parallel execution of different transaction subsets. In a further example, the data attribute may be embodied in the form of an identifier field comprised in the transaction data or may be embodied in the form of characteristic information carried by the transaction data. Whether a designated identifier field is comprised may be determined, or characteristic information of the transaction data may be extracted and then whether the characteristic information meets a preset condition may be determined, thereby determining a transaction dependency relationship of the transaction data according to the data attribute.

The transaction dependency relationship among the transaction data set forth in the embodiments of the present specification may be embodied by transaction association that is present when different transaction data is executed, for example, the association in aspects such as temporal order, transaction object, or execution result. For example, if an execution of transaction data with a later execution time is dependent on the result of execution of transaction data with an earlier execution time, or executions of different transaction data impact the same data state, then it is regarded that these two pieces of transaction data have a transaction dependency relationship. Conversely, it may be regarded that these two pieces of transaction data do not have a transaction dependency relationship.

A process of determining a transaction subset will be described in detail through examples.

(I) Determining a Transaction Subset According to Transaction Types of the Transaction Data In the embodiments of the present specification, a transaction subset may be determined according to transaction types of the transaction data. In one example, transaction data of the same transaction type is put into the same transaction subset, and transaction data of different transaction types are divided into different transaction subsets. Since there is no transaction dependency relationship among the transaction data of different transaction types, the result of data execution will not be affected regardless of an order in which transaction data of different transaction types is executed. Determining whether transaction data belongs to the same transaction subset according to transaction types of the transaction data can ensure that there is no transaction dependency relationship among the transaction data belonging to different transaction subsets, thereby enabling parallel processing of transaction data in different transaction subsets and favoring the improvement of the execution efficiency of data processing.

For example, after a contract-type transaction (which may also be referred to as a transaction) is executed, only corresponding contract data is changed, while after a transfer-type transaction (which may also be referred to as a transaction) is executed, the account balance data of both parties of the transfer is changed. In some embodiments, the order in which these two types of transactions are executed does not have an impact on the execution result. Therefore, dividing two different types of transactions into different transaction subsets can ensure that transaction data belonging to different transaction subsets do not have a transaction dependency relationship, and thus the transaction subsets can be processed in parallel without affecting the consistency in the database state.

(II) Determining a Transaction Subset According to Scopes of Data Change of the Transaction Data The scope of data change in the present specification refers to a set of one or more objects for execution of transaction data. In the embodiments of the present specification, according to the scopes of data change of the transaction data, transaction data having overlapping scopes of data change may be put into the same transaction subset, and transaction data having scopes of data change that do not overlap may be divided into different transaction subsets. When a transaction subset is determined according to scopes of data change of the transaction data, different pieces of transaction data may be executed in an order that these pieces of transaction data are generated, if the data ranges affected by the execution of these pieces of transaction data overlap, otherwise the result of data execution will be affected. On the other hand, if the data ranges affected by the execution of different pieces of transaction data do not overlap, an order of execution of these pieces of transaction data will not affect the data processing result. Therefore, determining a transaction subset according to scopes of data change of the transaction data may meet the need for parallel processing of different transaction subsets, thereby favoring the improvement of the execution efficiency of data processing.

In one example, the putting transaction data having overlapping scopes of data change into the same transaction subset, and dividing transaction data having scopes of data change that do not overlap into the different transaction subsets may comprise: traversing scopes of data change of the transaction data; if the scope of data change of a first transaction data overlaps with the scope of data change of a first transaction subset, adding the first transaction data into the first transaction subset; and if the scope of data change of the first transaction data does not overlap with the scope of data change of the first transaction subset, creating a second transaction subset that comprises the first transaction data; wherein the first transaction data is any piece of transaction data, the first transaction subset is any transaction subset in the transaction subsets, and the second transaction subset is different from the first transaction sub set.

The above-described process will be described below with reference to the flow chart shown in FIG. 2.

S1021: determining if all pieces of transaction data in the transaction set have been traversed, the process ends if yes, otherwise the process proceeds to execute step S1022;

S1022: obtaining any piece of transaction data TX from the transaction set. In some embodiments, the transaction data TX may be extracted and generated from transaction data that has not been put into a transaction subset; however, if the extracted transaction data TX has already been put into a transaction subset, the transaction data TX will be put into the same transaction subset after subsequent steps are executed without affecting the achievement of the technical object;

S1023: computing a scope of data change of the transaction data TX;

S1024: determining whether the scope of data change of the transaction data TX overlaps with the scope of data change of an existing transaction subset TXB;

S1025: if a determination result in the step S1024 is yes, adding the transaction data TX into the transaction subset TXB;

S1026: if the determination result in the step S1024 is no, creating a new transaction subset TXN, and adding the transaction data TX into the transaction subset TXN.

In some embodiments, the scope of data change of a transaction subset is to be recalculated when transaction data comprised in the transaction subset changes, and a union of scopes of data change of transaction data comprised in the transaction subset may be used as the scope of data change of the transaction subset.

For example, the execution object of a contract-type transaction is a contract ID, and contract data corresponding to the contract ID will be changed after the execution. The contract ID may be, for example, the scope of data change of the transaction data. If two pieces of transaction data are executed for the same contract ID, it may be deemed that the scopes of data change of these two pieces of transaction data overlap, and then these two pieces of transaction data may be included in the same transaction subset and executed in an order determined according to timestamps corresponding to the transaction data. If two pieces of transaction data are executed for different contract IDs, it may be deemed that the scopes of data change of these two pieces of transaction data do not overlap, and contract data corresponding to the different contract IDs will be changed when these two pieces of transaction data are executed. Therefore, the order of execution does not have impact on the execution result. These two pieces of transaction data may be included in different transaction subsets and executed in parallel.

In another example, the execution objects of a transfer-type transaction are accounts of both parties of the transfer, and after the transfer-type transaction is executed, the account balance data of both parties of the transfer will be changed. Therefore, accounts of both parties of the transfer may be, for example, the scope of data change of the transfer-type transaction data. Assuming that the transaction set comprises the following five pieces of transaction data: transaction data 1: transferring from account A to account B, then the scope of data change of the transaction data 1 may be expressed as (A, B); transaction data 2: transferring from the account B to the account A, then the scope of data change of the transaction data 2 may be expressed as (B, A); transaction data 3: transferring from account C to account E, then the scope of data change of the transaction data 3 may be expressed as (C, E); transaction data 4: transferring from account F to account X, then the scope of data change of the transaction data 4 may be expressed as (F, X); and transaction data 5: transferring from the account X to the account E, then the scope of data change of the transaction data 5 may be expressed as (X, E).

In some embodiments, the scopes of data change of the transaction data 1 and the transaction data 2 overlap, the scopes of data change of the transaction data 3 and the transaction data 5 overlap, and the scopes of data change of the transaction data 4 and the transaction data 5 overlap. Therefore, the transaction set comprising the transaction data 1 to the transaction data 5 may be divided into the following transaction subsets: transaction subset 1: comprising the transaction data 1 and the transaction data 2, and the scope of data change being (A, B); and transaction subset 2: comprising the transaction data 3, the transaction data 4, and the transaction data 5, and the scope of data change being (C, E, F, X).

In some embodiments, the scopes of data change of the transaction subset 1 and the transaction subset 2 do not overlap, and a parallel execution of the transaction subset 1 and the transaction subset 2 will not affect an execution result. Therefore, the transaction subset 1 and the transaction subset 2 may be executed in parallel to improve the execution efficiency. For the transaction subset 1, the scopes of data change of the transaction data 1 and the transaction data 2 overlap (which are even completely identical), and the execution of these two pieces of transaction data may depend on transaction data prior to the execution of these two pieces of transaction data. Therefore, an order of execution may be determined according to timestamps corresponding to these two pieces of transaction data, and these two pieces of transaction data will be executed in series in the temporal order. It is the same for the transaction subset 2. For example, it can be determined according to timestamps that the transaction data 4 of transferring from the account F to the account X is executed first, and then the transaction data 5 of transferring from the account X to the account E is executed. This execution order may be neither parallel nor reversed, since it is possible that the fund required by the transfer from the account X to the account E when the transaction data 5 is executed depends on the execution of the transaction data 4 of transferring from the account F to the account X.

Figure 2:
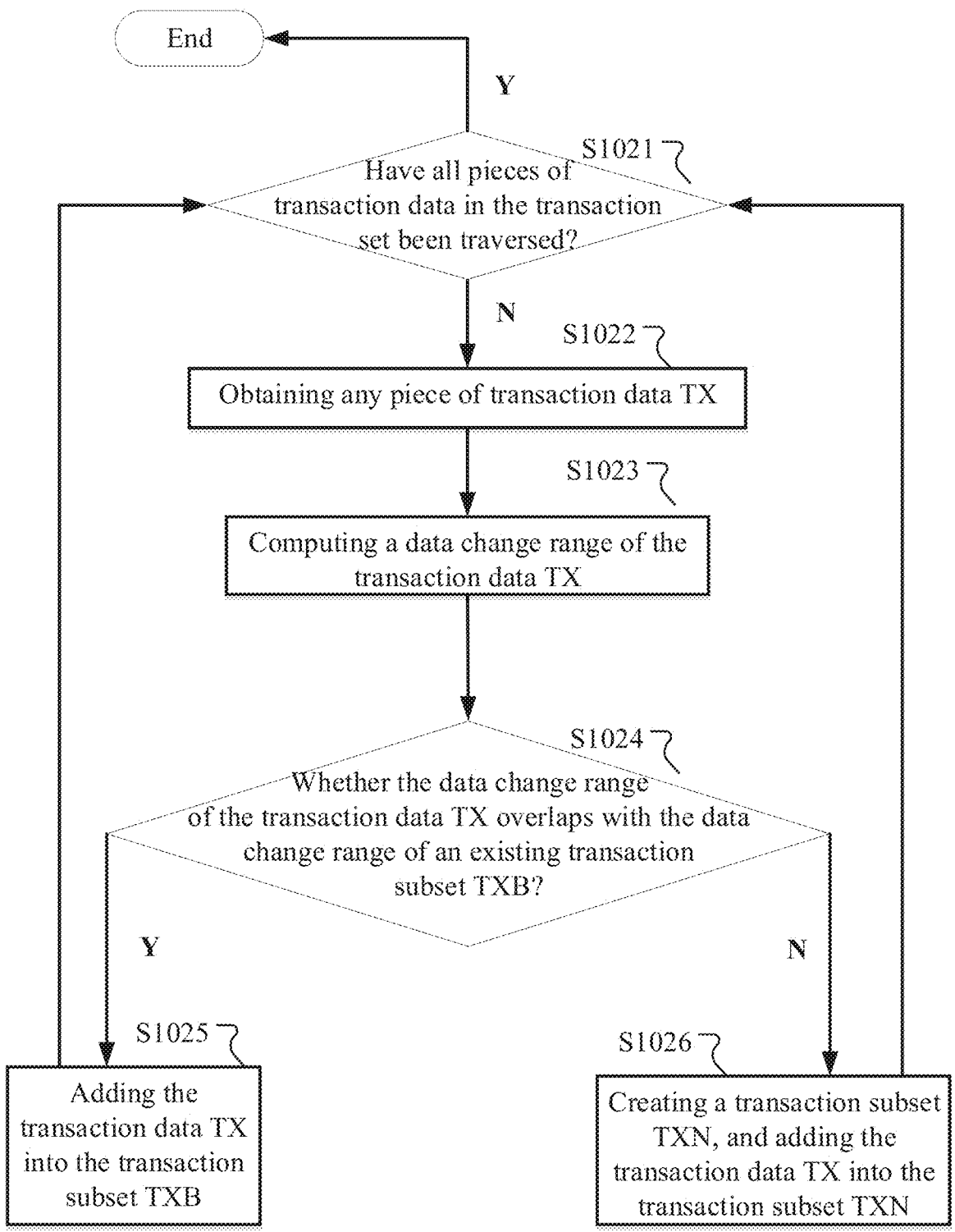
FIG. 2 is a flow chart of a second method for writing transaction data into a blockchain according to some embodiments of the present specification.

In some embodiments, the traversing scopes of data change of the transaction data in the transaction set may be implemented in the manner of S1022: obtaining any piece of transaction data as shown in the example in FIG. 2. Alternatively, the traversing may be implemented according to the temporal order of generation of the transaction data in the transaction set according to the timestamps of the transaction data.

(III) Determining a Transaction Subset According to Transaction Types and Scopes of Data Change of the Transaction Data In the embodiments of the present specification, transaction type and scope of data change may be combined for determining a transaction subset in phases and levels. In an exemplary implementation, division may be performed first according to scopes of data change, based on which a second division may be performed according to transaction types, and vice versa.

In some embodiments, the subset assignment may be performed according to transaction type at a primary level, and then according to scope of data change at a secondary level. The assigning the transaction data into transaction subsets comprises: determining one or more level I transaction subsets for the transaction data according to the transaction data's transaction type.

In one embodiment, the determining one or more level I transaction subsets for the transaction data according to the transaction data's transaction type comprises: assigning pieces of the transaction data with the same transaction type in a same level I transaction subset; and assigning pieces of the transaction data with different transaction types into different level I transaction subsets.

In one embodiment, the assigning the transaction data into transaction subsets further comprises: determining one or more level II transaction subsets for each of the one or more level I transaction subsets according to the transaction data's scope of data change, each of the one or more level II transaction subsets being a subset under one of the one or more level I transaction subsets. Executing the transaction subsets in parallel comprises: executing a plurality of level II transaction subsets corresponding to the one or more level I transaction subsets in parallel. For example, the transaction data may be assigned into level I transaction subsets A and B, of which transaction data in subset A is assigned into two level II transaction subset A1 and A2, and transaction data in subset B is assigned into one level II transaction subset B1 (here level I transaction subset B is the same as the level II transaction subset B1). Then, level II transaction subsets A1, A2, and B1 can be executed in parallel.

In one embodiment, the determining one or more level II transaction subsets for each of the one or more level I transaction subsets according to the transaction data's scope of data change comprises: assigning pieces of transaction data in each of the one or more level I subsets with the overlapping scope of data change in a same level II transaction subset; and assigning pieces of the transaction data in the each level I subset with no overlapping scope of data change into different level II transaction subsets.

In one embodiment, the determining one or more level II transaction subsets for each of the one or more level I transaction subsets according to the transaction data's scope of data change comprises: traversing a scope of data change of each piece of transaction data in a first level I transaction subset; in response to that a scope of data change of a second piece of transaction data overlaps with a scope of data change of a first level II transaction subset, adding the second piece of transaction data into the first level II transaction subset; and in response to that the scope of data change of the second piece of transaction data does not overlap with the scope of data change of the first level II transaction subset, creating a second level II transaction subset and adding the second piece of transaction data into the second level II transaction sub set.

That is, taking the first division according to transaction types and then the second division according to scopes of data change as an example, the implementation process of determining a transaction subset according to transaction types and scopes of data change of the transaction data may comprise: Step S1027 determining a level I subset to which the transaction data belongs according to the transaction types of the transaction data; then determining a level II subset to which the transaction data belongs according to the scopes of data change of the transaction data in the level I subset, and using the level II subset as the transaction subset, wherein the level II subset is a subset of the level I subset.

Here, the performing a first level division on the transaction set according to the transaction type and determining a level I subset to which the transaction data belongs may further comprise: according to the transaction types of the transaction data in the transaction set, putting transaction data of the same transaction type into the same level I subset, and dividing transaction data of different transaction types into different level I subsets.

Since there is a limited number of transaction types of transaction data, the determining transaction subsets that can be executed in parallel only according to transaction types may improve the execution efficiency to a degree, but may not achieve a satisfactory effect in cases where a large amount such as a high concurrent amount of transaction data is generated. Therefore, on the basis of the above-described division, the level I subsets determined according to transaction types are subject to second level division according to scopes of data change, and level II subsets obtained through the second level division are used as transaction subsets for parallel processing, so as to further improve the execution efficiency.

In one example, the determining a level II subset to which the transaction data belongs according to the scopes of data change of the transaction data in the level I subset comprises: according to the scopes of data change of the transaction data in the level I subset, putting transaction data having overlapping scopes of data change into the same level II subset, and dividing transaction data having scopes of data change that do not overlap into different level II sub sets.

Figure 3:
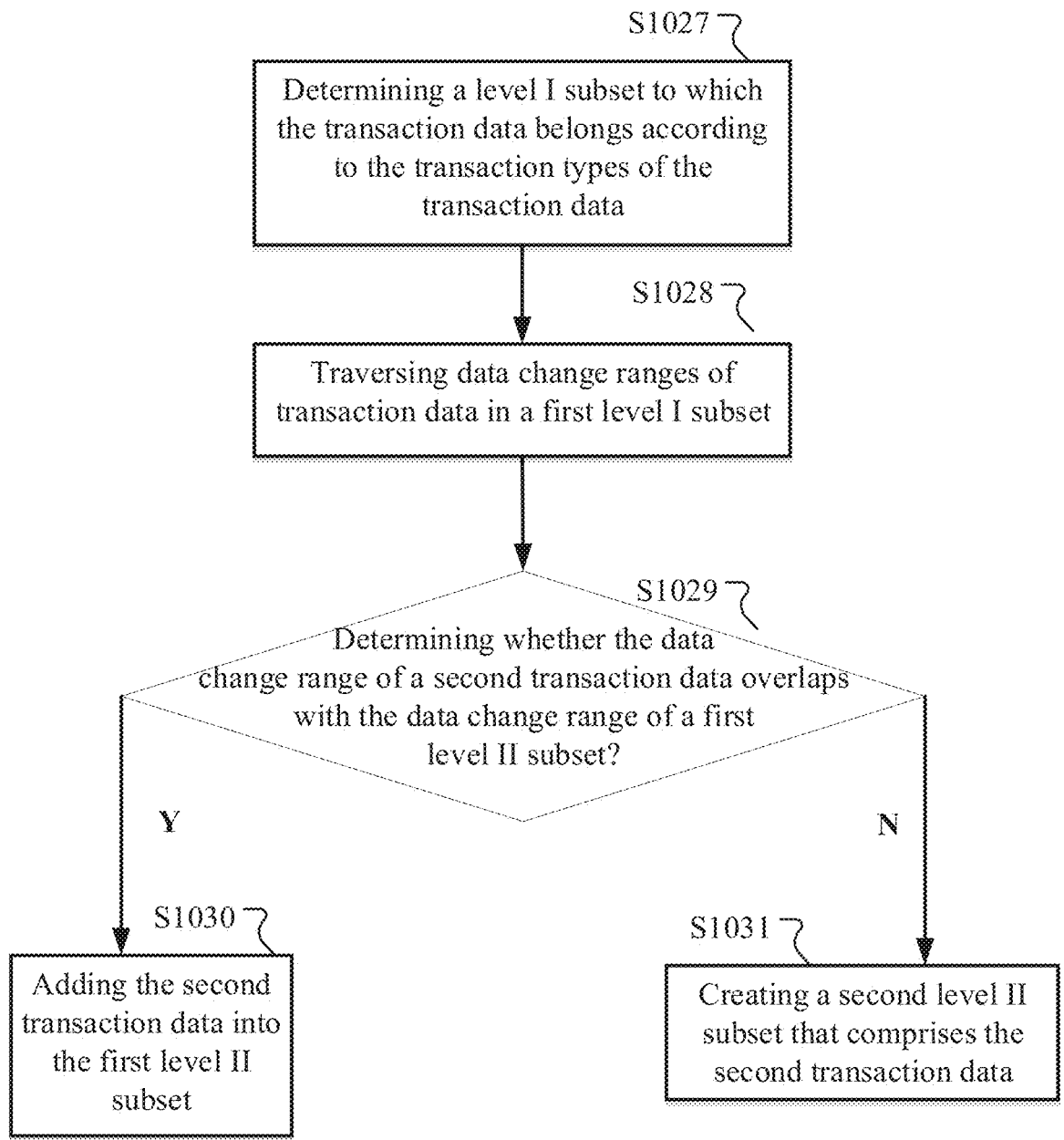
FIG. 3 is a flow chart of a third method for writing transaction data into a blockchain according to some embodiments of the present specification.

Furthermore, the according to the scopes of data change of the transaction data in the level I subset, putting transaction data having overlapping scopes of data change into the same level II subset, and dividing transaction data having scopes of data change that do not overlap into different level II subsets may comprise, as shown in FIG. 3:

S1028: traversing scopes of data change of transaction data in a first level I subset;

S1029: determining whether the scope of data change of a second transaction data overlaps with the scope of data change of a first level II subset;

S1030: if the scope of data change of the second transaction data overlaps with the scope of data change of the first level II subset, adding the second transaction data into the first level II subset; and

S1031: if the scope of data change of the second transaction data does not overlap with the scope of data change of the first level II subset, creating a second level II subset that comprises the second transaction data; wherein the first level I subset is any level I subset in the level I subsets, the second transaction data is any piece of transaction data in the first level I subset, the first level II subset is any level II subset in the first level I subset, and the second level II subset is different from the first level II subset.

The process of dividing level II subsets from the level I subsets is similar to the process and principle of dividing transaction subsets from a transaction set as described in No. (II), which will not be elaborated here.

Alternatively, the subset assignment may be performed according to scope of data change at a primary level, and then according to transaction type at a secondary level. Various detailed steps described above can be similarly applied here. In some embodiments, the assigning the transaction data into transaction subsets comprises: determining one or more level I transaction subsets for the transaction data according to the transaction data's scope of data change.

In one embodiment, the determining one or more level I transaction subsets for the transaction data according to the transaction data's scope of data change comprises: assigning pieces of the transaction data with the overlapping scope of data change in a same level I transaction subset; and assigning pieces of the transaction data with no overlapping scope of data change into different level I transaction subsets.

In one embodiment, the assigning the transaction data into transaction subsets further comprises: determining one or more level II transaction subsets for each of the one or more level I transaction subsets according to the transaction data's transaction type, each of the one or more level II transaction subsets being a subset under one of the one or more level I transaction subsets. Executing the transaction subsets in parallel comprises: executing a plurality of level II transaction subsets corresponding to the one or more level I transaction subsets in parallel. For example, the transaction data may be assigned into level I transaction subsets M and M, of which transaction data in subset M is assigned into two level II transaction subset M1 and M2, and transaction data in subset N is assigned into one level II transaction subset N1 (here level I transaction subset N is the same as the level II transaction subset N1). Then, level II transaction subsets M1, M2, and N1 can be executed in parallel.

In one embodiment, the determining one or more level II transaction subsets for each of the one or more level I transaction subsets according to the transaction data's transaction type comprises: assigning pieces of transaction data in each of the one or more level I subsets with the same transaction type in a same level II transaction subset; and assigning pieces of the transaction data in the each level I subset with different transaction types into different level II transaction subsets.

In one embodiment, the determining one or more level II transaction subsets for each of the one or more level I transaction subsets according to the transaction data's transaction type comprises: traversing a transaction type of each piece of transaction data in a first level I transaction subset; in response to that a transaction type of a second piece of transaction data is the same as a transaction type of one or more pieces of transaction data of a first level II transaction subset, adding the second piece of transaction data into the first level II transaction subset; and in response to that the transaction type of the second piece of transaction data is different from the transaction type of all pieces of transaction data of the first level II transaction subset, creating a second level II transaction subset and adding the second piece of transaction data into the second level II transaction subset.

Figure 4:
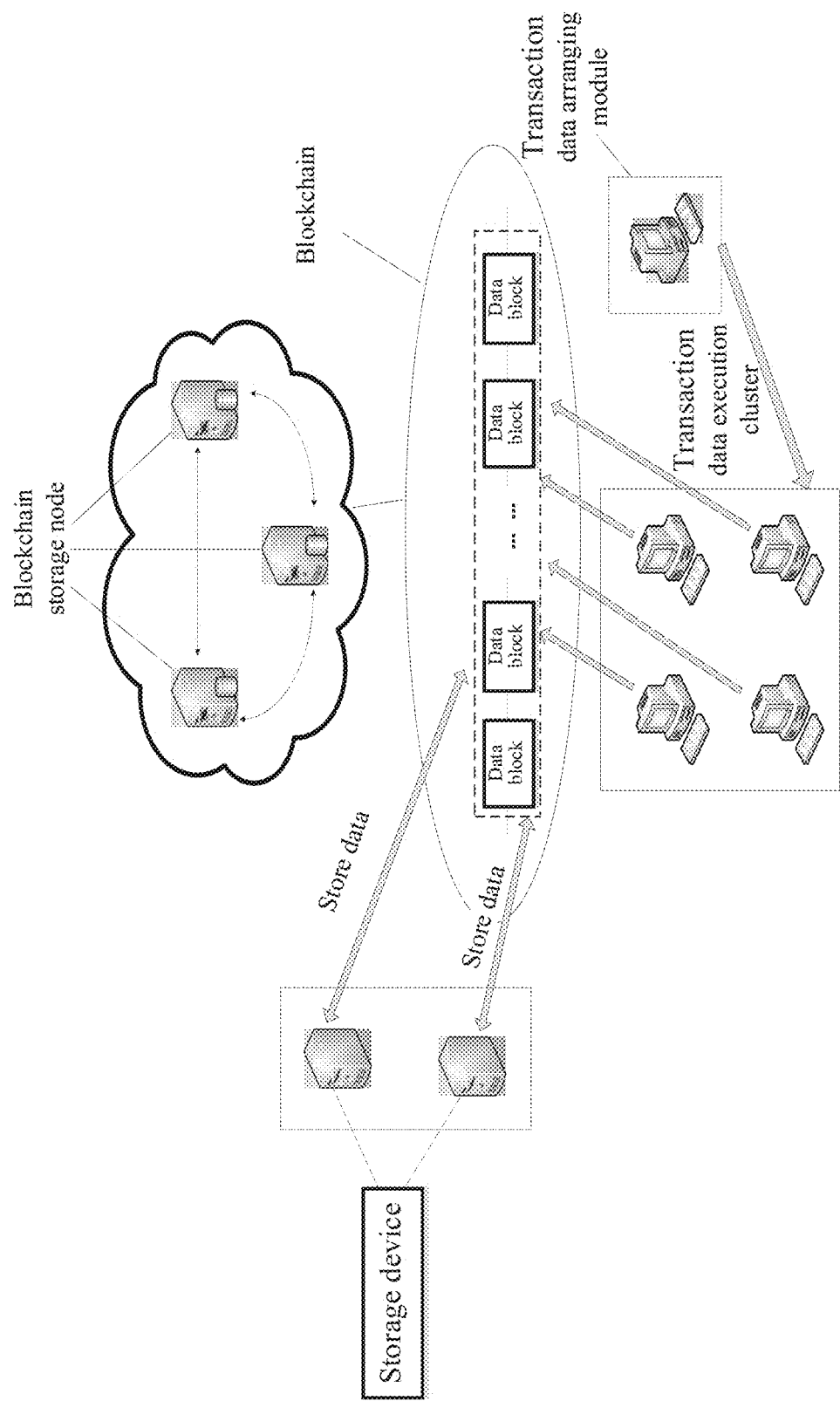
FIG. 4 is a schematic diagram of an exemplary specification scenario of the method for writing transaction data into a blockchain according to some embodiments of the present specification.

After the above-described implementation process is used for division of transaction subsets, the transaction subsets may be executed in parallel to complete the execution process of blockchain transaction data to write the execution result into the blockchain. As shown in FIG. 4, a transaction data arranging module is configured to achieve division of transaction subsets. A transaction data execution cluster executes transaction data in different transaction subsets in parallel, executes transaction data inside a transaction subset in series according to timestamps corresponding to the transaction data, and then writes the execution result into the blockchain, thereby ensuring the consistency in the blockchain database state, reducing the cost required for improving the execution efficiency of data processing, and improving expandability. When the execution result is written into a block of the blockchain, the results of execution of transaction data by the transaction data execution cluster may be summarized and then written into the blockchain. In one example, one designated computer in the cluster may complete the summarization of execution results.

In the current technologies, take the Ethereum application as an example, transaction data is sorted according to received timestamps of the transaction data when the transaction data is executed, and then the execution is performed in series in the temporal order to update account information after each piece of transaction data is executed. In the embodiments of the present specification, after transaction data to be written into a blockchain (i.e., the transaction data received by the blockchain) is obtained, the transaction data is classified first according to transaction types and/or scopes of data change to form transaction subsets, causing transaction data without a transaction dependency relationship to be divided into different transaction subsets and transaction data with a transaction dependency relationship to be put into the same transaction subset. The division of transaction data and determination of transaction subsets may be implemented by the transaction data arranging module shown in FIG. 4. After the transaction data arranging module completes the division of transaction data, the transaction data arranging module may distribute the transaction subsets to computers in the transaction data execution cluster for data processing. Each computer in the transaction data execution cluster only executes transaction data in an allocated transaction subset, follows the process of verification-implementation-recording in a blockchain to write an execution result into the blockchain. In an exemplary implementation, the transaction data arranging module and the transaction data execution cluster may also be, for example, jointly a transaction execution cluster to implement functions of reception, classification, distribution, and execution of transaction data, summarize execution results of transaction data, and to write the summarized execution results into the blockchain.

The embodiments of the present specification further provide another method for writing transaction data into a blockchain, comprising: obtaining a plurality of pieces of transaction data to be executed; determining first transaction data without a transaction dependency relationship according to scopes of data change of the transaction data, wherein there is no transaction dependency relationship among the first transaction data; and executing the first transaction data in parallel, and writing an execution result into the blockchain.

In one example, when the first transaction data is determined, transaction data with a scope of data change not overlapping another scope of data change of any other piece of transaction data may be determined as the first transaction data having no transaction dependency relationship according to scopes of data change of the transaction data.

Assuming that the obtained plurality of pieces of transaction data are as follows:

| Data No. | Transaction type | Scope of data change | Remarks |
|---|---|---|---|
| 1 | Contract | ID A | The execution will change data of ID A |
| 2 | Contract | ID A | The execution will change data of ID A |
| 3 | Contract | ID B | The execution will change data of ID B |
| 4 | Contract | ID C | The execution will change data of ID C |
| 5 | Transfer | Account X, Account Y | The execution will change data of Account X and Account Y |
| 6 | Transfer | Account Z, Account D | The execution will change data of Account Z and Account D |
| 7 | Transfer | Account X, Account M | The execution will change data of Account X and Account M |
| 8 | Transfer | Account N, Account L | The execution will change data of Account N and Account L |

According to scopes of data change of the transaction data, in some embodiments, the scopes of data change of the transaction data 3, 4, 6, and 8 do not overlap with a scope of data change of any other transaction data. Therefore, the order of execution of these pieces of transaction data does not affect the consistency in the database state. As a result, the parallel execution of these pieces of transaction data favors improving the execution efficiency of data processing, thereby reducing the cost required for improving the execution efficiency of data processing and improving expandability.

Figure 5:
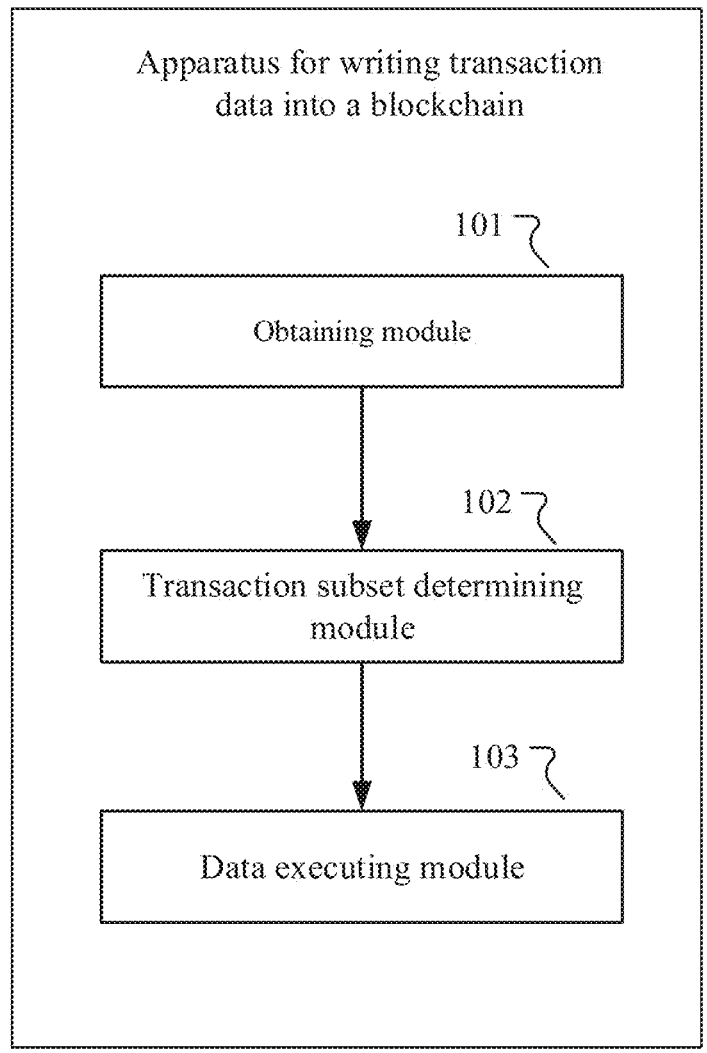
FIG. 5 is a schematic structural diagram of an apparatus for writing transaction data into a blockchain according to some embodiments of the present specification.

As shown in FIG. 5, an apparatus for writing transaction data into a blockchain according to the present specification may comprise: an obtaining module 101 configured to obtain transaction data to be added into the blockchain; a transaction subset determining module 102 configured to assign the transaction data into transaction subsets, wherein pieces of the transaction data having at least one of: a same transaction type or an overlapping scope of data change are assigned into a same transaction subset, and pieces of the transaction data with different transaction types and with no overlapping scope of data change are assigned into different transaction subsets; and a data executing module 103 configured to execute the transaction subsets in parallel and store results of the execution into the blockchain.

In some embodiments, the various modules and units of the apparatus for writing transaction data into a blockchain may be implemented as software instructions (or a combination of software and hardware). That is, the apparatus for writing transaction data into a blockchain described with reference to FIG. 5 may comprise a processor (e.g., the CPU) and a non-transitory computer-readable storage medium (e.g., the memory) storing instructions that, when executed by the processor, cause one or more components (e.g., the processor) of the apparatus to perform various steps and methods of the modules and units described above. The apparatus for writing transaction data into a blockchain may also be referred to as a system for writing transaction data into a blockchain. In some embodiments, the apparatus for writing transaction data into a blockchain may include a mobile phone, a tablet computer, a PC, a laptop computer, or another computing device.

In some embodiments, an apparatus corresponding to the method for writing transaction data into a blockchain in the above embodiments is disclosed. All descriptions of the above embodiments are applicable here, which will not be elaborated here.

The present specification further provides a method for determining a transaction subset of blockchain transaction data. Transaction data may be divided using this method, causing transaction data without a transaction dependency relationship to be executed in parallel, thereby reducing the cost required for improving the execution efficiency of data processing and improving expandability. The method comprises: after a plurality of pieces of transaction data to be executed are obtained, transaction subsets to which the transaction data belongs are determined according to transaction types and/or scopes of data change of the transaction data, for executing the transaction subsets in parallel, wherein there is no transaction dependency relationship among transaction data belonging to different transaction subsets.

In one example, the determining transaction subsets to which the transaction data belongs according to transaction types and/or scopes of data change of the transaction data may comprise: determining the transaction subsets to which the transaction data belongs according to a data attribute of the transaction data, wherein the data attribute has a corresponding relationship with a transaction type and/or a scope of data change of the transaction data, and the data attribute represents a transaction dependency relationship of the transaction data.

Furthermore, the determining transaction subsets to which the transaction data belongs according to transaction types of the transaction data may comprise: according to the transaction types of the transaction data, putting transaction data of the same transaction type into the same transaction subset, and dividing transaction data of different transaction types into different transaction subsets.

The determining transaction subsets to which the transaction data belongs according to scopes of data change of the transaction data may comprise: according to the scopes of data change of the transaction data, putting transaction data having overlapping scopes of data change into the same transaction subset, and dividing transaction data having scopes of data change that do not overlap into the different transaction subsets.

The determining transaction subsets to which the transaction data belongs according to transaction types and scopes of data change of the transaction data may further comprise: determining a level I subset to which the transaction data belongs according to the transaction types of the transaction data; and determining a level II subset to which the transaction data belongs according to the scopes of data change of the transaction data in the level I subset, and using the level II subset as the transaction subset, wherein the level II subset is a subset of the level I subset.

Detailed implementation corresponds to the step S102 in the above embodiments, and all relevant descriptions the above embodiments are applicable here, which will not be elaborated here.

One of ordinary skill in the art should understand that the embodiments of the present specification may be provided as a method, a system, or a computer program product. Therefore, the present specification may be implemented as a complete hardware embodiment, a complete software embodiment, or an embodiment combining software and hardware. Moreover, the present embodiments may be in the form of a computer program product implemented on one or more computer usable storage media (including, but not limited to, a magnetic disk memory, CD-ROM, an optical memory, etc.) comprising computer usable program codes.

The present specification is described with reference to flowcharts and/or block diagrams of the method, device (system), and computer program product according to the embodiments of the present specification. It should be understood that a computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, causing the instructions executed by a computer or a processor of other programmable data processing devices to generate an apparatus for implementing a function specified in one or more processes in the flowcharts and/or in one or more blocks in the block diagrams.

These computer program instructions may also be stored in a computer readable memory that can instruct a computer or other programmable data processing devices to work in a particular manner, causing the instructions stored in the computer readable memory to generate a manufactured article that includes an instruction apparatus. The instruction apparatus implements a function specified in one or more processes in the flowcharts and/or in one or more blocks in the block diagrams.

These computer program instructions may also be loaded onto a computer or other programmable data processing devices, causing a series of operational steps to be performed on the computer or other programmable devices, thereby generating computer-implemented processing. Therefore, the instructions executed on the computer or other programmable devices provide steps for implementing a function specified in one or more processes in the flowcharts and/or in one or more blocks in the block diagrams.

In a typical configuration, the computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash memory (flash RAM). The memory is an example of a computer readable medium.

Computer readable media include permanent, volatile, mobile, and immobile media, which can implement information storage through any method or technology. The information may be computer readable instructions, data structures, program modules, or other data. Examples of storage media of computers include, but are not limited to, Phase-change Random Access Memories (PRAMs), Static Random Access Memories (SRAMs), Dynamic Random Access Memories (DRA Ms), other types of Random Access Memories (RA Ms), Read-Only Memories (ROMs), Electrically Erasable Programmable Read-Only Memories (EE-PROMs), flash memories or other memory technologies, Compact Disk Read-Only Memories (CD-ROMs), Digital Versatile Discs (DVDs) or other optical memories, cassettes, cassette and disk memories or other magnetic memory devices, or any other non-transmission media, which can be used for storing information accessible to a computation device. According to the definitions in the specification, the computer readable media do not include transitory media (transitory media), such as modulated data signals and carriers.

The terms of "including," "comprising," or any other variants of the terms are intended to encompass a non-exclusive inclusion, causing a process, method, commodity, or device comprising a series of elements to not only comprise these elements, but also comprise other elements that are not listed, or further comprise elements that are inherent to the process, method, commodity, or device.

When there is no further restriction, elements defined by the statement "comprising one . . . " does not exclude a process, method, commodity, or device comprising the above elements from further comprising additional identical elements.

One of ordinary skill in the art should understand that the embodiments of the present specification may be provided as a method, a system, or a computer program product. Therefore, the present specification may be implemented as a complete hardware embodiment, a complete software embodiment, or an embodiment combining software and hardware. Moreover, the present specification may be in the form of a computer program product implemented on one or more computer usable storage media (including, but not limited to, a magnetic disk memory, CD-ROM, an optical memory, etc.) comprising computer usable program codes.

The above-described are mere embodiments of the present specification, which are not used to limit the present specification. To one of ordinary skill in the art, the present specification may have various modifications and changes. Any modification, equivalent substitution, or improvement made within the spirit and principle of the present specification shall be encompassed by the claims of the present specification.

What is claimed is:

1. A system for adding transaction data into a blockchain, comprising one or more processors and one or more non-transitory computer-readable memories coupled to the one or more processors and configured with instructions executable by the one or more processors to cause the system to perform operations comprising:
   obtaining a plurality of pieces of transaction data to be added into the blockchain;
   assigning transaction data of the plurality of pieces of transaction data with an overlapping range of data change into a same level I transaction subset and transaction data of the plurality of pieces of transaction data without the overlapping range of data change into different level I transaction subsets;
   assigning transaction data that is assigned under the level I transaction subsets into one or more level II transaction subsets according to a transaction type, wherein for each of the level I transaction subsets, pieces of transaction data, in the corresponding level I transaction subset, with a same transaction type are assigned in a same level II transaction subset, and pieces of the transaction data, in the corresponding level I transaction subset, with different transaction types are assigned into different level II transaction subsets; and
   executing the one or more level II transaction subsets in parallel, and storing results of the execution into the blockchain.

2. The system according to claim 1, wherein the executing the one or more one or more level II transaction subsets in parallel comprises:
   executing at least a portion of the plurality of pieces of transaction data assigned in the different level II transaction subsets in parallel using multithreading or a machine cluster.

3. The system according to claim 1, wherein:
   each piece of the plurality of pieces of transaction data corresponds to a timestamp; and
   the executing the one or more level II transaction subsets in parallel comprises: executing at least a portion of the plurality of pieces of transaction data assigned in the same level II transaction subset in series according to a temporal order corresponding to the timestamps.

4. The system according to claim 1, wherein the assigning the transaction data that is assigned under the level I transaction subsets into one or more level II transaction subsets according to a transaction type comprises:
   traversing a transaction type of each piece of transaction data in each of the level I transaction subsets;
   in response to that a transaction type of a second piece of transaction data is the same as a transaction type of one or more pieces of transaction data of a first level II transaction subset, adding the second piece of transaction data into the first level II transaction subset; and
   in response to that the transaction type of the second piece of transaction data is different from the transaction type of all pieces of transaction data of the first level II transaction subset, creating a second level II transaction subset and adding the second piece of transaction data into the second level II transaction subset.

5. The system according to claim 4, wherein there is a corresponding relationship between the plurality of pieces of transaction data and timestamps, and the traversing the transaction type comprises:
   traversing the transaction type of each piece of transaction data in each of the level I transaction subsets in a temporal order corresponding to the timestamps according to the timestamps of the transaction data.

6. The system according to claim 1, wherein the plurality of pieces of transaction data to be executed are obtained to form a transaction set to be executed comprising the plurality of pieces of transaction data, and the transaction set is determined by a preset data processing amount and preset transaction data time.

7. The system according to claim 6, wherein the preset data processing amount is determined according to an amount of data allowed to be written into the blockchain.

8. A non-transitory computer-readable storage medium configured with instructions executable by one or more processors to cause the one or more processors to perform operations comprising:
   obtaining a plurality of pieces of transaction data to be added into the blockchain;
   assigning transaction data of the plurality of pieces of transaction data with a same transaction type into a same level I transaction subset and transaction data of the plurality of pieces of transaction data with different transaction types into different level I transaction subsets;
   assigning transaction data that is assigned under the level I transaction subsets into one or more level II transaction subsets according to a range of data change, wherein for each of the level I transaction subsets, pieces of transaction data, in the corresponding level I transaction subset, with an overlapping range of data change are assigned in a same level II transaction subset, and pieces of the transaction data, in the corresponding level I transaction subset, with no overlapping range of data change are assigned into different level II transaction subsets; and
   executing the one or more level II transaction subsets in parallel, and storing results of the execution into the blockchain.

9. The non-transitory computer-readable storage medium according to claim 8, wherein the executing the one or more one or more level II transaction subsets in parallel comprises:

executing at least a portion of the plurality of pieces of transaction data assigned in the different level II transaction subsets in parallel using multithreading or a machine cluster.

10. The non-transitory computer-readable storage medium according to claim 8, wherein:
   each piece of the plurality of pieces of transaction data corresponds to a timestamp; and
   the executing the one or more level II transaction subsets in parallel comprises: executing at least a portion of the plurality of pieces of transaction data assigned in the same level II transaction subset in series according to a temporal order corresponding to the timestamps.

11. The non-transitory computer-readable storage medium according to claim 8, wherein the assigning the transaction data that is assigned under the level I transaction subsets into one or more level II transaction subsets according to a range of data change comprises:
   traversing a range of data change of each piece of transaction data in each of the level I transaction subsets;
   in response to that a range of data change of a second piece of transaction data overlaps with a range of data change of a first level II transaction subset, adding the second piece of transaction data into the first level II transaction subset; and
   in response to that the range of data change of the second piece of transaction data does not overlap with the range of data change of the first level II transaction subset, creating a second level II transaction subset and adding the second piece of transaction data into the second level II transaction subset.

12. The non-transitory computer-readable storage medium according to claim 11, wherein there is a corresponding relationship between the one or more pieces of transaction data and timestamps, and the traversing the transaction type comprises:
   traversing the range of data change of each piece of transaction data in each of the level I transaction subsets in a temporal order corresponding to the timestamps according to the timestamps of the transaction data.

13. The non-transitory computer-readable storage medium according to claim 8, wherein the plurality of pieces of transaction data to be executed are obtained to form a transaction set to be executed comprising the transaction data, and the transaction set is determined by a preset data processing amount and preset transaction data time.

14. The non-transitory computer-readable storage medium according to claim 13, wherein the preset data processing amount is determined according to an amount of data allowed to be written into the blockchain.

15. A non-transitory computer-readable storage medium configured with instructions executable by one or more processors to cause the one or more processors to perform operations comprising:
   obtaining a plurality of pieces of transaction data to be added into the blockchain;
   assigning transaction data of the plurality of pieces of transaction data with an overlapping range of data change into a same level I transaction subset and transaction data of the plurality of pieces of transaction data without the overlapping range of data change into different level I transaction subsets;
   assigning transaction data that is assigned under the level I transaction subsets into one or more level II transaction subsets according to a transaction type, wherein for each of the level I transaction subsets, pieces of transaction data, in the corresponding level I transaction subset, with a same transaction type are assigned in a same level II transaction subset, and pieces of the transaction data, in the corresponding level I transaction subset, with different transaction types are assigned into different level II transaction subsets; and
   executing the one or more level II transaction subsets in parallel, and storing results of the execution into the blockchain.

16. The non-transitory computer-readable storage medium according to claim 15, wherein the executing the one or more one or more level II transaction subsets in parallel comprises:
   executing at least a portion of the plurality of pieces of transaction data assigned in the different level II transaction subsets in parallel using multithreading or a machine cluster.

17. The non-transitory computer-readable storage medium according to claim 15, wherein:
   each piece of the plurality of pieces of transaction data corresponds to a timestamp; and
   the executing the one or more level II transaction subsets in parallel comprises: executing at least a portion of the plurality of pieces of transaction data assigned in the same level II transaction subset in series according to a temporal order corresponding to the timestamps.

18. The non-transitory computer-readable storage medium according to claim 15, wherein the assigning the transaction data that is assigned under the level I transaction subsets into one or more level II transaction subsets according to a transaction type comprises:
   traversing a transaction type of each piece of transaction data in each of the level I transaction subsets;
   in response to that a transaction type of a second piece of transaction data is the same as a transaction type of one or more pieces of transaction data of a first level II transaction subset, adding the second piece of transaction data into the first level II transaction subset; and
   in response to that the transaction type of the second piece of transaction data is different from the transaction type of all pieces of transaction data of the first level II transaction subset, creating a second level II transaction subset and adding the second piece of transaction data into the second level II transaction subset.

19. The non-transitory computer-readable storage medium according to claim 18, wherein there is a corresponding relationship between the plurality of pieces of transaction data and timestamps, and the traversing the transaction type comprises:
   traversing the transaction type of each piece of transaction data in each of the level I transaction subsets in a temporal order corresponding to the timestamps according to the timestamps of the transaction data.

20. The non-transitory computer-readable storage medium according to claim 15, wherein the plurality of pieces of transaction data to be executed are obtained to form a transaction set to be executed comprising the plurality of pieces of transaction data, and the transaction set is determined by a preset data processing amount and preset transaction data time.

* * * * *